Aug. 13, 1957            R. F. SMITH            2,802,357
AUTOMOBILE DOOR LOCK CONTROL MECHANISM
Filed Aug. 9, 1954            3 Sheets-Sheet 3
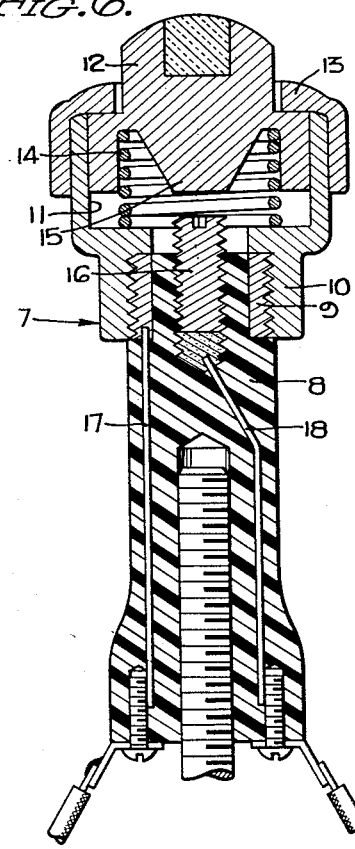
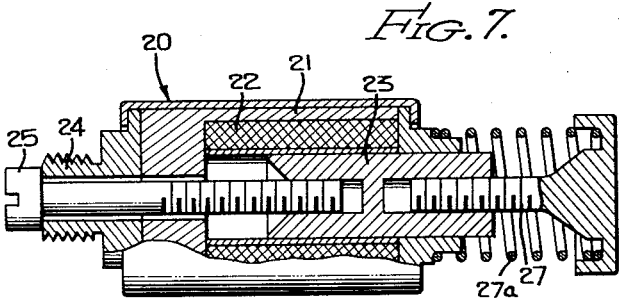
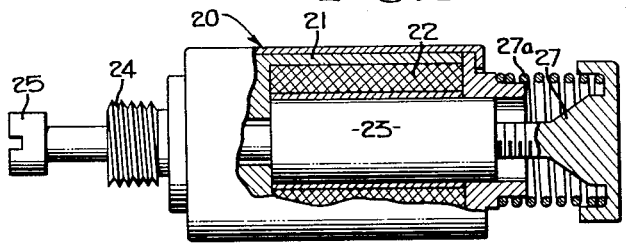
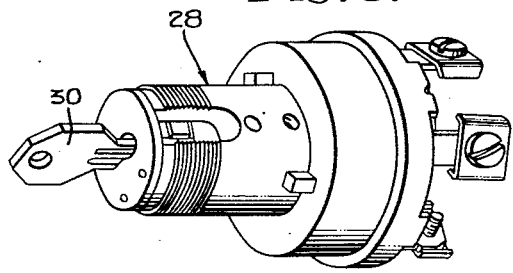
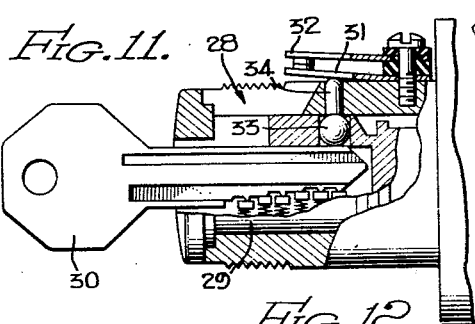
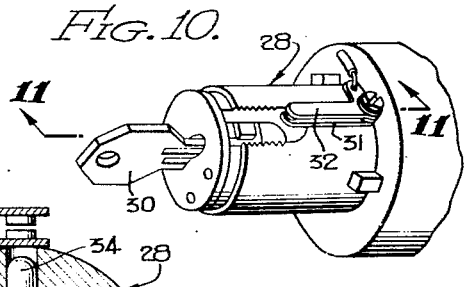
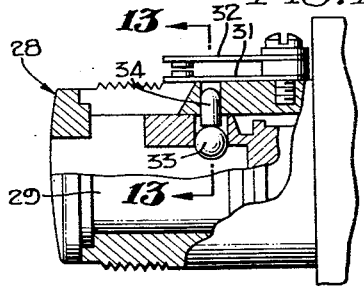
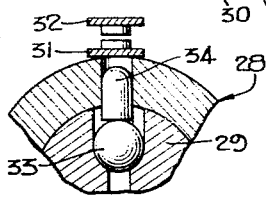
INVENTOR,
ROBERT F. SMITH
BY
Lyon & Lyon
ATTORNEYS

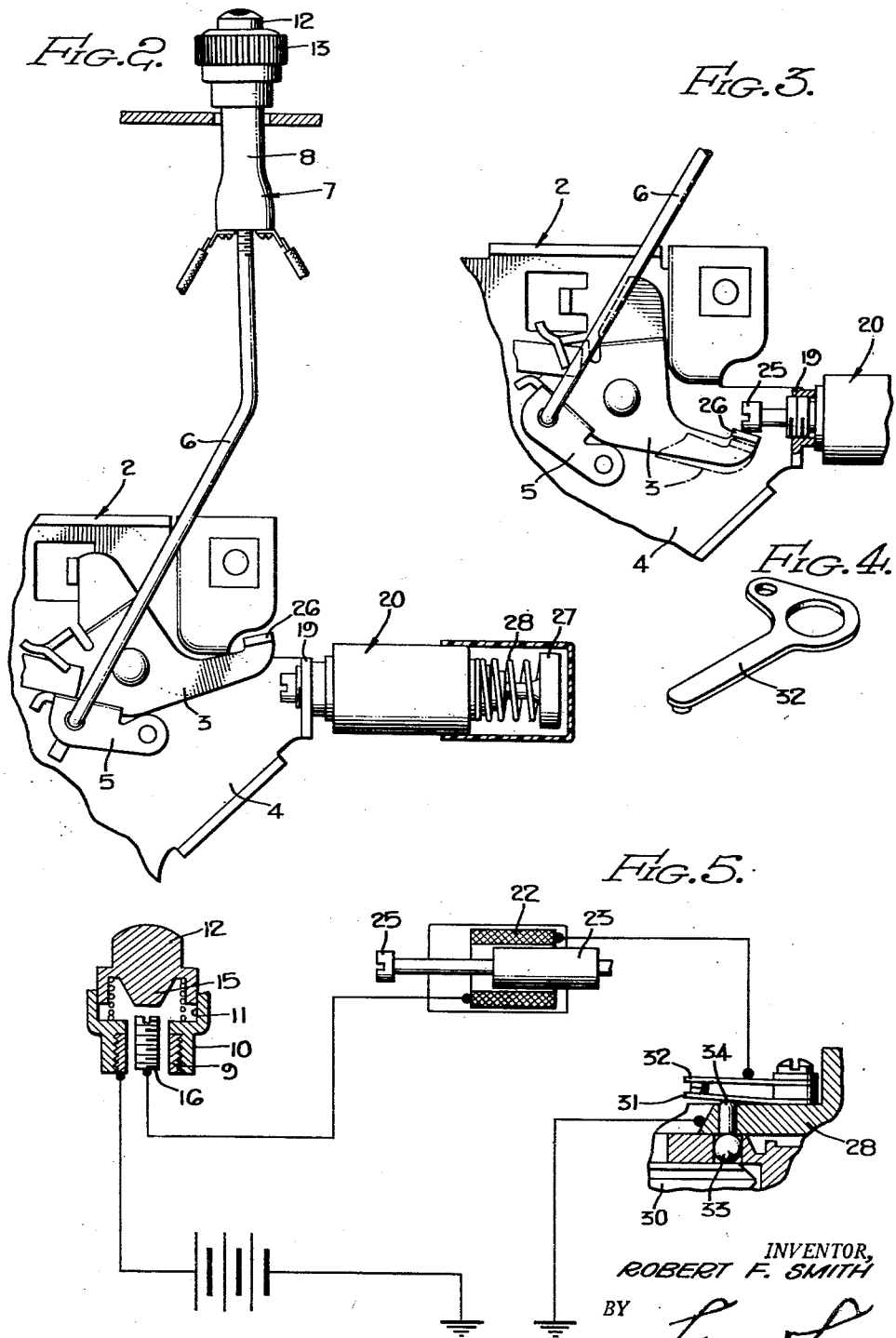

United States Patent Office 2,802,357
Patented Aug. 13, 1957

2,802,357

AUTOMOBILE DOOR LOCK CONTROL MECHANISM

Robert F. Smith, Los Angeles, Calif.

Application August 9, 1954, Serial No. 448,717

7 Claims. (Cl. 70—283)

My invention relates to automobile door lock control mechanisms, and included in the objects of my invention are:

First, to provide an automobile door lock control mechanism whereby one may lock the doors of an automobile without use of a key, but which is so arranged that one is prevented from accidentally locking the doors if the key has been inadvertently left in the ignition so as to prevent one from locking himself out of his automobile.

Second, to provide a mechanism of this class whereby the user may deliberately lock the automobile doors, even though the key be in the ignition, as might be desired when the automobile is occupied to prevent opening of the doors by children, or by unauthorized persons outside the automobile.

Third, to provide a mechanism of this class which may be incorporated in the doors and ignition lock of conventional automobiles with a minimum of alteration or special tooling.

Fourth, to provide a mechanism of this class which requires a minimum of instruction to the user.

With the above and other objects in view, as may appear hereinafter, reference is directed to the accompanying drawings, in which:

Fig. 2 is a fragmentary view, similar to Fig. 1, showing the door lock in its locked condition;

Fig. 3 is another fragmentary view, showing the manner in which the door lock is prevented from movement to its locked condition;

Fig. 4 is a perspective view of a contact element employed in my invention on the automobile ignition lock;

Fig. 5 is a diagrammatic view, emphasizing the electrical components of my control mechanism;

Fig. 6 is an enlarged longitudinal sectional view of the door lock operating means incorporating my invention;

Fig. 7 is a sectional view, partially in elevation, of a solenoid unit employed in my invention to prevent the door lock being set in its locked condition, the solenoid being shown in its normal or retracted position;

Fig. 8 is a similar sectional view, partially in elevation, showing the solenoid in its extended or operating position;

Fig. 9 is a perspective view of an automobile ignition lock arranged to incorporate my invention;

Fig. 10 is a similar fragmentary perspective view, showing my contact means incorporated in the ignition lock;

Fig. 11 is a fragmentary, partial sectional, partial elevational view, taken through 11—11 of Fig. 10 showing a key inserted in the ignition lock;

Fig. 12 is a similar partial sectional, partial elevational view, showing the condition of the lock when the key is removed; and Fig. 13 is a fragmentary sectional view, through 13—13 of Fig. 12.

Figure 1:
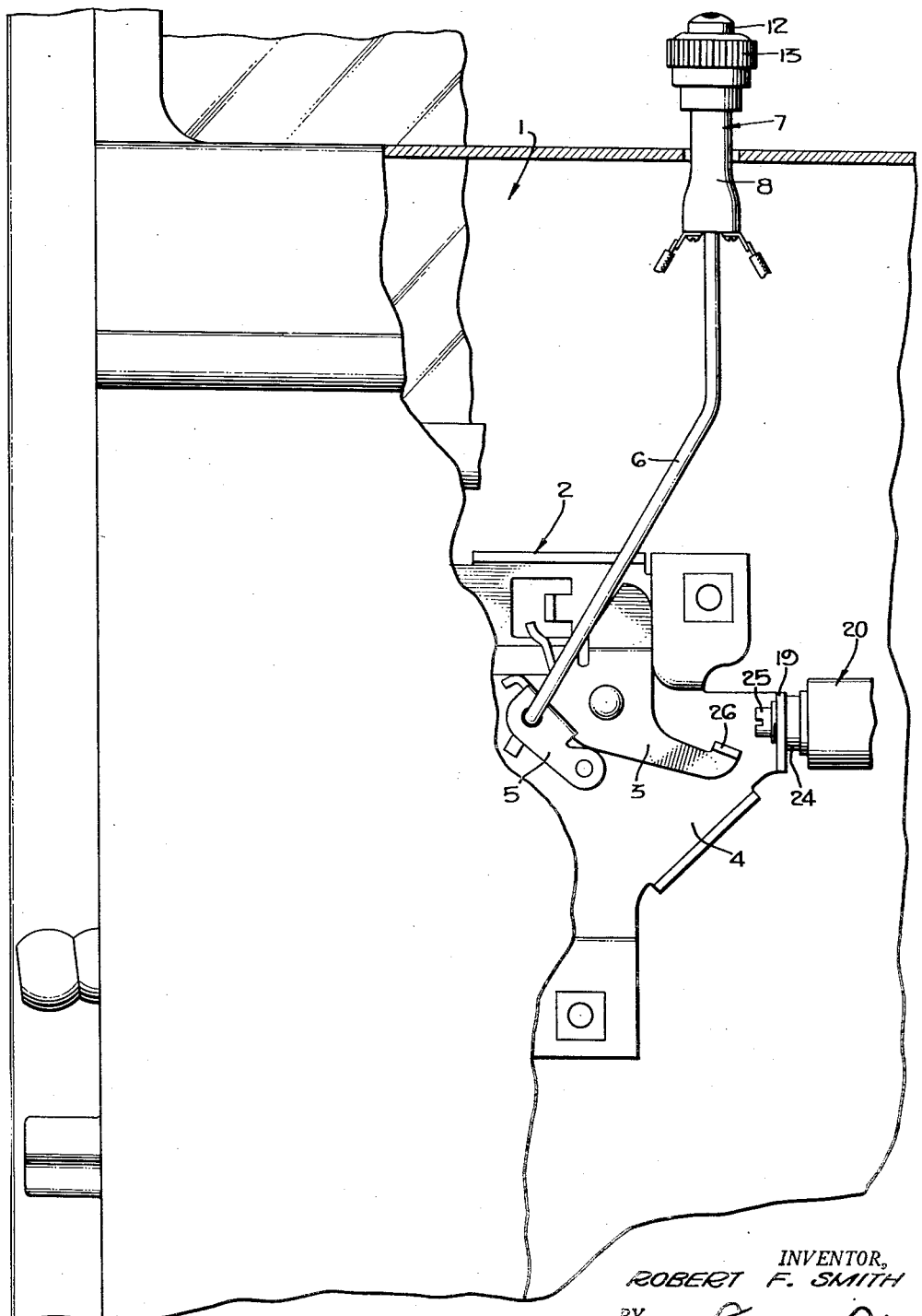
Figure 1 is a fragmentary view of an automobile door, partially in elevation and partially in section, showing a conventional door lock modified to incorporate my invention and showing the door lock in its unlocked condition.

My automobile door lock control mechanism is particularly adapted to be incorporated in the door locking system of automobiles which are so arranged that the doors may be locked by positioning a control button, then closing the door with the handle turned in a predetermined position, although my control mechanism is not necessarily limited thereto.

While my invention is shown in connection with a particular door and ignition lock, it is to be understood that my control mechanism is adapted to other types of door and ignition locks. Thus, for purposes of illustration, reference is first directed to Fig. 1 in which is shown fragmentarily a car-door 1 having a door lock 2 of conventional construction. In this illustration, only those portions of the door lock concerned with the function of my invention are illustrated. These include particularly a keeper lever 3 pivotally mounted in a suitable frame structure 4 and having an offset lug 5 to which is pivotally attached the lower end of an operating rod 6 which extends upwardly through an aperture in the lower margin of the door opening.

The upper end of the rod 6 is, in the conventional automobile door lock, attached to a push button. In the exercise of my invention, I substitute a special handle structure 7. The handle structure 7 (best illustrated in Fig. 6) comprises a body 8 of insulating material having a ferrule 9 at one end for screw threaded attachment to a collar 10 terminating in an upwardly directed socket 11. Slidably mounted within the socket 11 is a push button 12 secured by a suitable retainer ring 13. A spring 14 normally holds the push button 12 in its extended position. Depending from the push button 12 is a contact lug 15 which is adapted to engage a contact screw 16 set in the body 8. Lead wires 17 and 18 extend downwardly through the body 8 and are provided with suitable terminals.

The frame structure 4 of the standard door lock 2 is modified to form a bracket 19 which supports a solenoid structure 20, shown best in Figs. 7 and 8. The solenoid structure 4 includes a case 21 containing a solenoid coil 22 and an armature 23. One end of the case 21 is provided with a mounting boss 24 for attachment to the bracket 19. The armature is provided with a screw stem 25 which is adapted to project into the frame structure 4 upon energizing of the solenoid to engage an arm 26 projecting from the keeper lever 3. The opposite end of the armature 23 is provided with a screw 27 and a spring 27a so that the armature 23 and the screw stem 25 are normally held in their retracted positions, shown in Figs. 1, 2, and 7.

Reference is now directed to Figs. 9 to 13 which illustrate an ignition switch lock of the cylinder type 28, which may be considered conventional except for provision of contact means operated by the presence of the key in the ignition switch lock. The ignition switch lock includes a conventional tumbler carrying rotatable plug unit 29 engaged by a key 30. Supported on one side of the ignition switch lock by suitable insulation means is a pair of contacts 31 and 32. These contacts are normally separated, and one of the contacts is grounded to the ignition switch lock.

The tumbler carrying rotatable plug unit 29 is provided with a radial bore which receives a ball 33. The casing of the ignition switch lock 28 is provided with a corresponding bore which receives a pin 34 disposed under the contact 31. The ball 33 is adapted to be engaged by the key 30 so as to force the pin 34 outwardly and close the contacts 31 and 32. Also, the contacts are held closed by the periphery of the tumbler carrying rotatable plug unit when it is turned by the key.

As shown in Fig. 5, the solenoid coil 22 is electrically connected in series with the contacts 31 and 32 carried by the ignition switch lock and with the contact lug 15 and screw 16 incorporated in the handle structure 7.

Operation of my automobile door lock control mechanism is as follows:

In the normal course of locking the vehicle doors, the ignition key 30 is removed from the ignition switch lock 28; consequently, the contacts 31 and 32 are open. Under such condition, the vehicle door may be closed in the conventional manner which may include the combined manipulation of the handle structure 7 and the conventional door handle, not shown, or manipulation of the handle structure 7 only.

It will be observed that, by comparison of Figs. 1 and 2, the door keeper lever 3 may be moved from its unlatched position, shown in Fig. 1, to its latched position, shown in Fig. 2, by depressing the handle structure 7 and the rod 6.

Should the key 30 be left in the ignition switch lock 28, as shown particularly in Figs. 5 and 11, the contacts 31 and 32 will be closed. Thus, if one presses downwardly on the push button 12 of the handle structure 7 the contact plug 15 and screw 16 will close the circuit through the solenoid coil 22 before the keeper lever 3 has an opportunity to move, with the result that the screw stem 25 will be extended to engage the arm 26 of the keeper 3 and prevent the keeper from operating to secure the door lock. Failure of the door to lock serves as a warning to the user that the key is in the ignition lock.

It is often desirable to deliberately lock the car doors even though the key may be in the ignition lock, for example, when it is desired to prevent accidental opening of the door by children or to protect the car occupants from intruders. If this is desired, the upper portion of the body 8, or more particularly the retainer 13, is grasped without engaging the push button 12. Then, the handle structure 7 may be depressed without closing the contact lug 15 and contact screw 16 so that the solenoid coil 22 is not energized and the keeper lever 3 of the door lock may be moved to its door-securing position.

Having fully described my invention, it is to be understood that I do not wish to be limited to the details herein set forth, but my invention is of the full scope of the appended claims.

I claim:

1. The combination with an automobile door lock having a manually operable element for setting the door lock in its locked condition without the use of a key, and an ignition lock, of a door lock control mechanism, comprising: a first switch associated with said ignition lock adapted to be closed by presence of a key in said ignition lock; a second switch associated with said manually operated element normally adapted to be closed upon initiating operation of said element prior to setting said door lock in its locked condition; and a solenoid means in series with said switches and operable upon closing both of said switches to prevent setting of said door lock in its locked condition.

2. The combination with an automobile door lock having a manually operable element for setting the door lock in its locked condition without the use of a key, and an ignition lock, of a door lock control mechanism, comprising: a first switch associated with said ignition lock adapted to be closed by presence of a key in said ignition lock; a second switch associated with said manually operated element normally adapted to be closed upon initiating operation of said element prior to setting said door lock in its locked condition; a solenoid means in series with said switches and operable upon closing both of said switches to prevent setting of said door lock in its locked condition; and manually accessible means on said manually operable element for by-passing said second switch to permit setting of said door lock in a locked condition irrespective of the presence of a key in said ignition lock.

3. A control mechanism for automobile door locks, comprising: a first switch in association with an automobile ignition lock adapted to be closed upon insertion of a key in said ignition lock; a manually operable element movable to set the door lock of said automobile in its locked condition; a second switch associated with said element and normally adapted to be closed on initiating movement of said element prior to setting said door lock in its locked condition; and a solenoid unit including an armature and means moved thereby to prevent said manually operable element from setting said door lock in its locked condition, said solenoid being in series with both of said switches whereby said solenoid unit is operable only if a key is present in said ignition lock upon attempt to operate said manually operable element.

4. A control mechanism for automobile door locks, comprising: a first switch in association with an automobile ignition lock adapted to be closed upon insertion of a key in said ignition lock; a manually operable element movable to set the door lock of said automobile in its locked condition; a second switch associated with said element and normally adapted to be closed on initiating movement of said element prior to setting said door lock in its locked condition; a solenoid unit including an armature and means moved thereby to prevent said manually operable element from setting said door lock in its locked condition, said solenoid being in series with both of said switches whereby said solenoid unit is operable only if a key is present in said ignition lock upon attempt to operate said manually operable element; and manually accessible means on said manually operable element for by-passing said second switch to permit setting of said door lock in its locked condition irrespective of the presence of a key in said ignition lock.

5. The combination with an automobile having a door and door lock assembly including a rod extending upwardly therefrom to the door opening and manually operable to set said door lock in its locked condition, and an ignition lock adapted to receive a key; a first switch associated with said ignition lock adapted to be closed by presence of a key in said ignition lock; a handle for said rod, said handle including a second switch adapted to be closed when manipulating said handle and rod prior to setting said door lock in its locked condition; and a solenoid unit in series with both of said switches and including means operable to prevent setting of door lock in its locked condition upon closing of both said switches, whereby said solenoid unit is operable only if a key is present in said ignition lock and attempt is made to operate said handle to set said door lock in its locked condition.

6. A combination as set forth in claim 5, wherein: said handle includes means manually engageable without closing said switch whereby said door lock may be set in its locked condition irrespective of the presence of a key in said ignition lock.

7. The combination with an automobile door lock having a manually operable element for setting the door lock in its locked condition without the use of a key, and an ignition lock, of a door lock control mechanism, comprising: a first control means responsive to the presence of a key in said ignition lock; a second control means associated with said manually operable element; a door lock restraining means series connected with said first and second control means to prevent setting of said door lock in its locked condition by said manually operable element in the event of presence of a key in said ignition lock; and means for by-passing said second control means to permit setting of said door lock in its locked condition by said manually operable element irrespective of the presence of a key in said ignition lock.

References Cited in the file of this patent

UNITED STATES PATENTS

| | | |
|---|---|---|
| 2,105,350 | FitzGerald | Jan. 11, 1938 |
| 2,189,346 | Kamp | Feb. 6, 1940 |
| 2,506,851 | Ayers | May 9, 1950 |